(12) United States Patent
Kung et al.

(10) Patent No.: US 9,959,024 B2
(45) Date of Patent: May 1, 2018

(54) METHOD FOR LAUNCHING APPLICATIONS OF HANDHELD COMPUTER THROUGH PERSONAL COMPUTER

(71) Applicant: I/O INTERCONNECT, LTD., Santa Ana, CA (US)

(72) Inventors: Gary Kung, Taipei (TW); Johnny Chen, Taipei (TW)

(73) Assignee: I/O INTERCONNECT, LTD., Santa Ana, CA (US)

( * ) Notice: Subject to any disclaimer, the term of this patent is extended or adjusted under 35 U.S.C. 154(b) by 315 days.

(21) Appl. No.: 15/049,020

(22) Filed: Feb. 20, 2016

(65) Prior Publication Data

US 2016/0216867 A1  Jul. 28, 2016

Related U.S. Application Data

(63) Continuation-in-part of application No. 14/607,046, filed on Jan. 27, 2015.

(51) Int. Cl.

| | | |
|---|---|---|
| G06F 3/0484 | (2013.01) | |
| G06F 9/445 | (2018.01) | |
| G06F 13/42 | (2006.01) | |
| G06F 13/38 | (2006.01) | |
| G06F 3/0482 | (2013.01) | |
| G06F 3/14 | (2006.01) | |
| G06F 3/0481 | (2013.01) | |

(52) U.S. Cl.
CPC ........ *G06F 3/04842* (2013.01); *G06F 3/0482* (2013.01); *G06F 3/04817* (2013.01); *G06F 3/1454* (2013.01); *G06F 9/445* (2013.01); *G06F 13/387* (2013.01); *G06F 13/4282* (2013.01); *G06F 9/451* (2018.02)

(58) Field of Classification Search
None
See application file for complete search history.

(56) References Cited

U.S. PATENT DOCUMENTS

| | | |
|---|---|---|
| 6,999,008 B2 | 2/2006 | Wang et al. |
| 7,450,031 B2 | 11/2008 | Wang et al. |
| 7,479,902 B2 | 1/2009 | Wang et al. |
| 8,276,085 B2 | 9/2012 | Sherwani |
| 8,825,034 B2 | 9/2014 | Ton et al. |
| 9,098,429 B2 | 8/2015 | Varanda et al. |
| 9,632,648 B2 * | 4/2017 | Lee .................. G06F 3/048 |

(Continued)

OTHER PUBLICATIONS

Accessory Development Kit 2012 Guide, Android Developers—Accessory Development Kit 2012, 1-14.

*Primary Examiner* — Tuan S Nguyen

(74) *Attorney, Agent, or Firm* — Locke Lord LLP; Tim Tingkang Xia, Esq.

(57) ABSTRACT

A method for launching software applications of a smartphone through a personal computer connected thereto is disclosed. The method includes the steps of: a) operatably connecting the handheld computer to the personal computer; b) the personal computer acquiring information of used times of applications of the handheld computer; c) converting tops of the most frequently used applications into items in a subwindow of the personal computer; and d) launching one of the applications by clicking an item in the subwindow, wherein the clicked item corresponds to the launched application.

6 Claims, 3 Drawing Sheets

(56) References Cited

U.S. PATENT DOCUMENTS

| | | |
|---|---|---|
| 2003/0220988 A1 | 11/2003 | Hymel |
| 2006/0218499 A1* | 9/2006 | Matthews ......... G06F 17/30616 715/765 |
| 2007/0124358 A1 | 5/2007 | Levi et al. |
| 2008/0071935 A1 | 3/2008 | Ohta |
| 2010/0045611 A1 | 2/2010 | Nelson et al. |
| 2011/0113166 A1 | 5/2011 | Hung et al. |
| 2011/0225553 A1 | 9/2011 | Abramson et al. |
| 2012/0040719 A1 | 2/2012 | Lee et al. |
| 2013/0047198 A1* | 2/2013 | Srour ..................... G06F 9/485 726/1 |
| 2013/0050222 A1 | 2/2013 | Moran et al. |
| 2013/0181898 A1* | 7/2013 | Liu ....................... G06F 3/0488 345/157 |
| 2013/0278484 A1* | 10/2013 | Hwang ................. G06F 3/1423 345/2.3 |
| 2013/0307796 A1 | 11/2013 | Liu et al. |
| 2014/0189679 A1 | 7/2014 | Adams et al. |
| 2014/0258367 A1 | 9/2014 | Suryavanshi et al. |
| 2014/0258368 A1 | 9/2014 | Suryavanshi et al. |
| 2014/0330992 A1 | 11/2014 | Li |
| 2015/0363182 A1 | 12/2015 | He |
| 2016/0034058 A1 | 2/2016 | Stauber et al. |

\* cited by examiner

METHOD FOR LAUNCHING APPLICATIONS OF HANDHELD COMPUTER THROUGH PERSONAL COMPUTER

CROSS-REFERENCE TO RELATED APPLICATIONS

This application is a continuation-in-part of U.S. patent application Ser. No. 14/607,046, filed Jan. 27, 2015.

BACKGROUND OF THE INVENTION

1. Technical Field

The invention relates to combination of a personal computer and a handheld computer such as a smartphone or tablet, particularly to integration of operation of applications of a handheld computer through a personal computer.

2. Related Art

Handheld computers, such as smartphones and tablets, have become essential for most people. Users of handheld computers have the need to connect their handheld computers to an external personal computer such as a desktop or a laptop computer which serves as a second computer. Some specific applications can open a subwindow within a screen picture on the display of the external personal computer to show a screen picture of the handheld computer on the personal computer when the handheld computer has been connected to the personal computer. Of course, the screen picture of the subwindow is the same as that of the handheld computer, for example, the items which separately stand for various software applications and are shown on the handheld computer.

By means of such specific software applications, although a user can launch a software application of a handheld computer by clicking a corresponding item in the subwindow of the personal computer, the contents of the subwindow is always the same as the handheld computer and no frequently used software applications can be shown on the personal computer. That is a fly in the ointment for users who always or usually connect their handheld computers to a personal computer because they cannot directly and quickly launch their frequently used software applications by clicking an item in the subwindow. However, there is no solution on the market yet.

SUMMARY OF THE INVENTION

An object of the invention is to provide a method for launching applications of a handheld computer through a personal computer, which can automatically generate a list of the most frequently used software applications and show the list on the personal computer connected thereto. Thus a user can directly and quickly launch one of the most frequently used software applications by clicking an item in the list shown on the personal computer.

To accomplish the above said object, the method for launching applications of a handheld computer through a personal computer of the invention includes the steps of:

a) operatably connecting the handheld computer to the personal computer;

b) the personal computer acquiring information of used times of applications of the handheld computer;

c) converting tops of the most frequently used applications into items in a subwindow of the personal computer; and d) launching one of the applications by clicking an item in the subwindow, wherein the clicked item corresponds to the launched application.

DETAILED DESCRIPTION OF THE INVENTION

Figure 1:
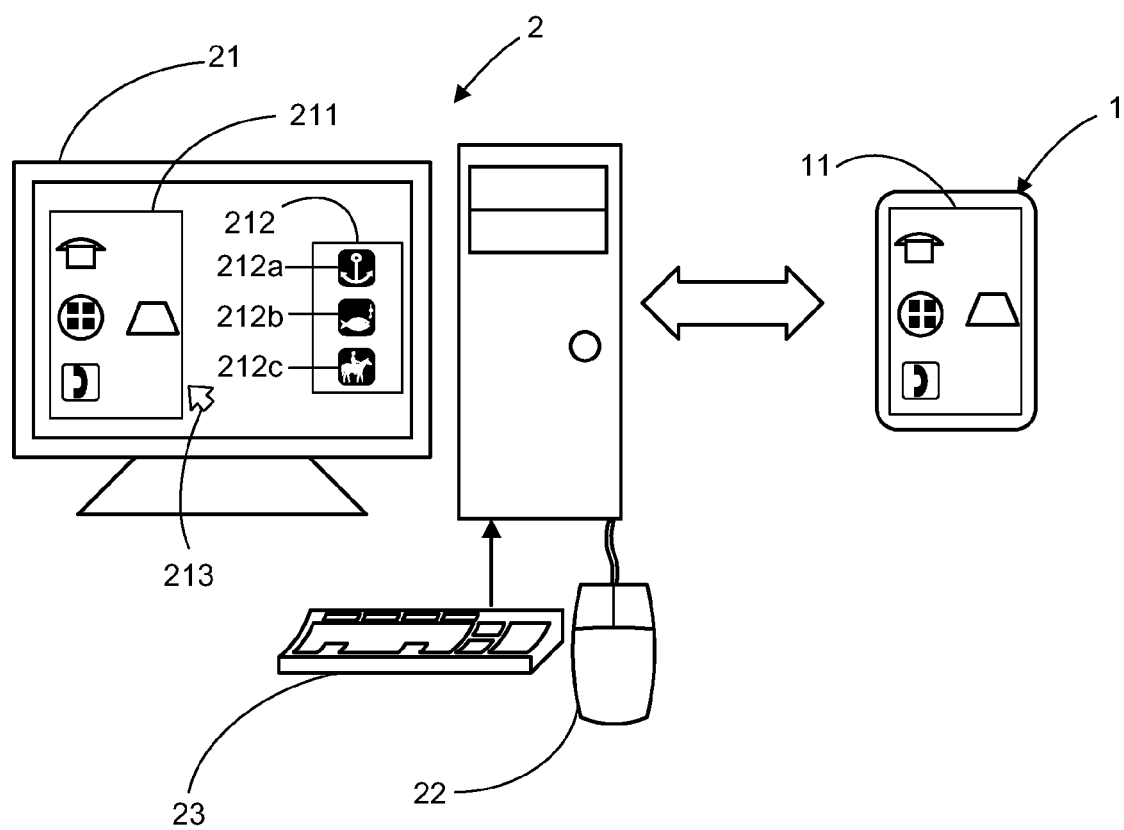
FIG. 1 is a schematic view of hardware arrangement of the invention.

Please refer to FIG. 1. The invention provides a method for launching software applications of a handheld computer 1 through a personal computer 2. The handheld computer 1 may be based upon an Android operating system. The personal computer 2 may be a desktop or laptop computer based upon a Windows operating system. Of course, the handheld computer 1 and the personal computer 2 must be provided with a first display 11 and a second display 21, respectively. Additionally, the personal computer is provided with a mouse 22 and a keyboard 23. There must be a cursor 213 shown on the second display 21.

Figure 2:
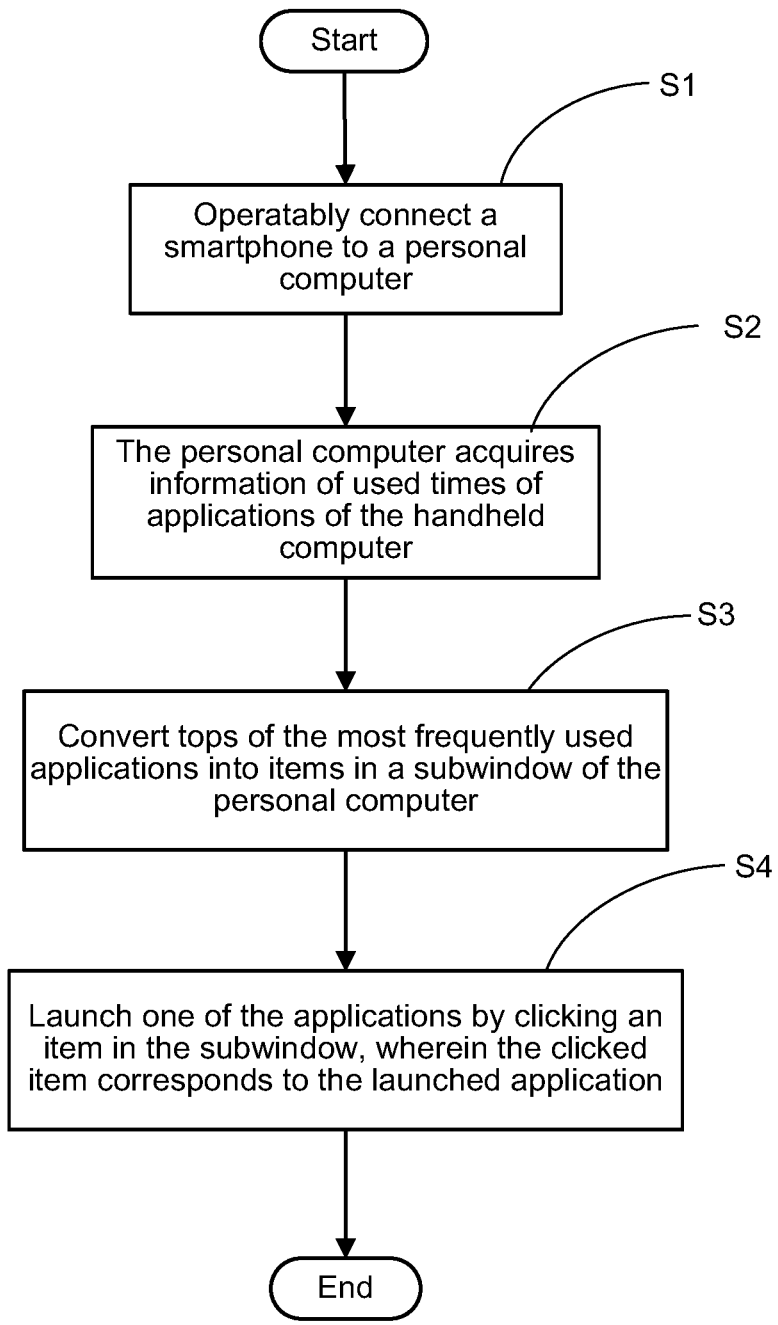
FIG. 2 is a flowchart of the method of the invention.

Please refer to FIG. 2, which shows a flowchart of the method of the invention. In step S1, the handheld computer 1 is operatably connected to the personal computer 2. The connection between the handheld computer 1 and the personal computer 2 may be wired or wireless. Such a wired connection may be implemented by a USB (universal serial bus) cable (not shown). In detail, an AOA (Android Open Accessory) protocol is performed between the handheld computer 1 and the personal computer 2 through the USB cable. A wireless connection between the handheld computer 1 and the personal computer 2 may be implemented by a BLUETOOTH or Wi-Fi communication protocol. A screen picture of the handheld computer 1 is projected on the second display 21 of the personal computer 2 in a handheld computer subwindow 211. The personal computer 2 still keeps working independently. Of course, all contents including items, pictures and their relative position of the handheld computer subwindow 211 are the same as the handheld computer 1. Additionally, both the handheld computer 1 and the personal computer 2 are separately installed with proprietary software applications. Then a communication channel is created between the handheld computer 1 and the personal computer 2.

In step S2, the proprietary software application in the personal computer 2 acquires information of used times of software applications of the handheld computer 1 through the proprietary soft application in the handheld computer 1.

In step S3, according to the information acquired in step S2, the personal computer 2 converts the tops of the most frequently used applications into items 212a, 212b and 212c in a shortcut subwindow 212 of the second display 21 of the personal computer 2. In other words, the tops of the most frequently used applications of the handheld computer 1 are shown in the shortcut subwindow 212. As a result, a user can directly view the most frequently used applications of the handheld computer 1 on the second display 21 of the personal computer 2.

Figure 3:
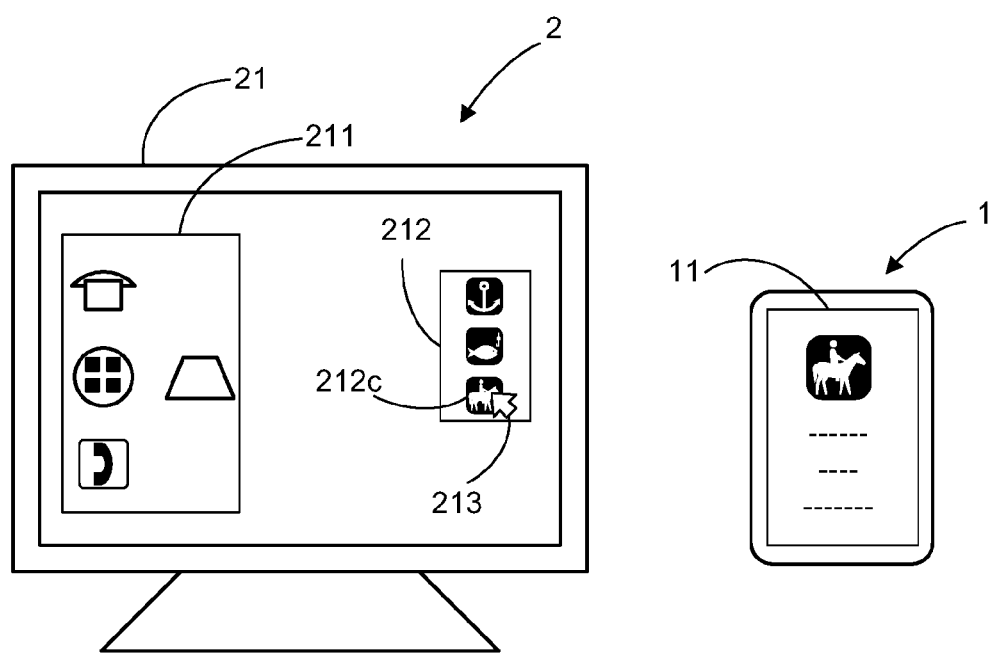
FIG. 3 is a schematic view showing an item in the shortcut subwindow is clicked to launch a software application of the handheld computer.

Finally, in step S4, the handheld computer 1 launches one of the applications by using the cursor 213 to click an item 212a, 212b or 212c in the shortcut subwindow 212, wherein the clicked item 212c corresponds to the launched application as shown in FIG. 3. Meantime, the handheld computer subwindow 211 is still shown on the second display 21 of the personal computer 2.

In sum, by the method of the invention, the most frequently used applications of the handheld computer 1 can be the shown on a shortcut subwindow 212 of the personal computer 2 and can be launched by clicking the items in the shortcut subwindow 212. This will be very helpful for those users who connect their handheld computers to a personal computer.

It will be appreciated by persons skilled in the art that the above embodiment has been described by way of example only and not in any limitative sense, and that various alterations and modifications are possible without departure from the scope of the invention as defined by the appended claims.

What is claimed is:

1. A method for launching applications of a handheld computer through a personal computer, comprising:
   operatably connecting the handheld computer to the personal computer;
   displaying a screen picture of the handheld computer in a handheld computer subwindow on a display of the personal computer;
   in response to displaying the screen picture of the handheld computer in the handheld computer subwindow, acquiring information of used times of applications of the handheld computer by the personal computer, and converting tops of the most frequently used applications into items in a shortcut subwindow on the display of the personal computer; and
   launching one of the applications only on the handheld device by clicking an item in the shortcut subwindow, wherein the clicked item corresponds to the launched application,
   wherein when the one of the applications is launched on the handheld device, the handheld computer subwindow and the shortcut subwindow are still displayed on the display of the personal computer.

2. The method of claim 1, wherein a connection between the handheld computer and the personal computer is a wired link.

3. The method of claim 2, wherein the wired link is a USB (universal serial bus) cable.

4. The method of claim 3, wherein an AOA (Android Open Accessory) protocol is performed between the handheld computer and the Windows personal computer through the USB cable.

5. The method of claim 1, wherein a connection between the handheld computer and the personal computer is a wireless link.

6. The method of claim 5, wherein the wireless connection is a BLUETOOTH or Wi-Fi communication protocol.

* * * * *